United States Patent
Hochmuth et al.

(10) Patent No.: US 12,437,098 B2
(45) Date of Patent: Oct. 7, 2025

(54) GENERATING ACCESS TOKENS FOR DIRECT DATA PLANE REQUESTS

(71) Applicant: Alteryx, Inc., Irvine, CA (US)

(72) Inventors: Roland Manfred Hochmuth, Fort Collins, CO (US); Jonathan Lounsbury, Alexandria, VA (US)

(73) Assignee: Alteryx, Inc., Irvine, CA (US)

( * ) Notice: Subject to any disclaimer, the term of this patent is extended or adjusted under 35 U.S.C. 154(b) by 122 days.

(21) Appl. No.: 18/526,957

(22) Filed: Dec. 1, 2023

(65) Prior Publication Data

US 2025/0181740 A1    Jun. 5, 2025

(51) Int. Cl.
*G06F 21/00*    (2013.01)
*G06F 21/62*    (2013.01)

(52) U.S. Cl.
CPC .................... *G06F 21/6218* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 9,083,527 | B1* | 7/2015 | McCorkendale | H04L 9/0872 |
| 9,659,068 | B1* | 5/2017 | Mattsson | H04R 1/1041 |
| 11,122,048 | B2* | 9/2021 | Akselrod | H04L 63/083 |
| 11,489,671 | B2* | 11/2022 | Rosado | G06F 9/45558 |
| 12,177,185 | B1* | 12/2024 | Ryland | H04L 63/102 |
| 12,236,121 | B2* | 2/2025 | Pabón | G06F 3/0622 |
| 2019/0124059 | A1* | 4/2019 | Perlmutter | H04L 63/0807 |
| 2020/0412538 | A1* | 12/2020 | Rosado | H04L 63/126 |
| 2020/0412720 | A1* | 12/2020 | Siefker | H04L 41/0895 |
| 2024/0080313 | A1* | 3/2024 | Parla | H04L 67/14 |

* cited by examiner

*Primary Examiner* — Ghodrat Jamshidi
(74) *Attorney, Agent, or Firm* — FIG. 1 Patents

(57) ABSTRACT

A data analytics system receives a data access request from a client device at a control plane. The data access request is a request to access a set of target data files stored by the data analytics system. The data analytics system identifies a data plane that stores the set of target data files and generates an access token for the client device based on the request and the identified data plane. The access token is a token that contains authorization information for the client device to request the target data files directly from identified data plane. The client device can transmit the access token to the data plane to request the target data files. The data plane receives the data file request with the access token, collects the target data files, and transmits them to the client device.

20 Claims, 4 Drawing Sheets

GENERATING ACCESS TOKENS FOR DIRECT DATA PLANE REQUESTS

BACKGROUND

Data analytics involves extracting information having business value from large data sets. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). A data analytics system provides these services for smaller entities that need data analytics but lack the computing resources to perform these processes themselves.

Data analytics system commonly provide services for many different users and allow those different users to store and analyze their data together through one system on, for example, a cloud infrastructure. In one instance, the data analytics system utilizes a split-plane architecture including a control plane and a data plane, creating a separation between platform services and data processing. To ensure that each user's data is properly segregated from others, a particular data plane may be hosted on a user's cloud environment (e.g., within user's own virtual private cloud (VPC)), and the data analytics system may coordinate processing of data for the user, and is generally only accessible by users associated with the data plane. The data analytics system uses another logical plane, the control plane, to coordinate services for driving the platform, and is hosted within the data analytics system's own cloud environment. This control plane is generally accessible by all users of the data analytics system, and thereby serves as a central system for scheduling and managing tasks performed by the data analytics system, as well as user authentication and authorization, web applications and API's, and the like.

Typically, a control plane coordinates servicing of requests for data from client devices. For example, the control plane may receive data requests from client devices, identify the data planes responsible for the requested data, prompt the data planes to process the data analytics requests, and pass along the response to the requests to the client devices. Additionally, since data planes tend not to have access to user permission information, data planes typically check with the control plane to validate that a user is authorized to make a request that the data plane receives. Accordingly, by serving as a central point of contact for client devices, the control plane becomes incredibly complex and resource intensive, and requires many intra-system messages to pass between the control plane and the data planes. For many, user data flowing through the control plane, even if transient, may be an insecure form of communication for deployment. Thus, data analytics systems using conventional control planes and data planes tend to be more difficult to maintain and more resource intensive to operate.

SUMMARY

A data analytics system generates access tokens for client devices querying the system so that the client devices can directly query a data plane. A data analytics system receives a query request from a client device at a control plane. The query request is a request for one or more operations to be performed on data accessible by one or more data resources. The data analytics system performs an authorization check on whether a user of the client device is authorized to access the one or more data resources. Responsive to the authorization check, the data analytics system generates an access token for the client device based on the request and the identified data plane. The access token is a token that contains authorization information for the client device indicating the one or more data resources the user of the client device is allowed to access.

The client device can transmit the access token to the data plane to perform the query on the target data files. The data plane receives the second query request with the access token, performs the operations of the query request on the data by at least accessing the one or more data resources, and transmits the response to the query request to the client device. In some cases, the data file request is a POST request and the data plane collects responses until it receives a corresponding GET request to transmit the response to the client device.

By generating an access token and providing the token to the client device, the data analytics system offloads query services from the control plane to the data pane. Additionally, where the access token contains authorization information for the user's request, the data plane can simply check that the authorization information is valid rather than requesting verification from the control plane. The data analytics system thereby reduces the overall complexity of the system by reducing messages between the control plane and the data plane. This reduction in messaging also reduces the overall resources used by the data analytics system, since data no longer needs to pass through a control plane to be provided to a client device.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
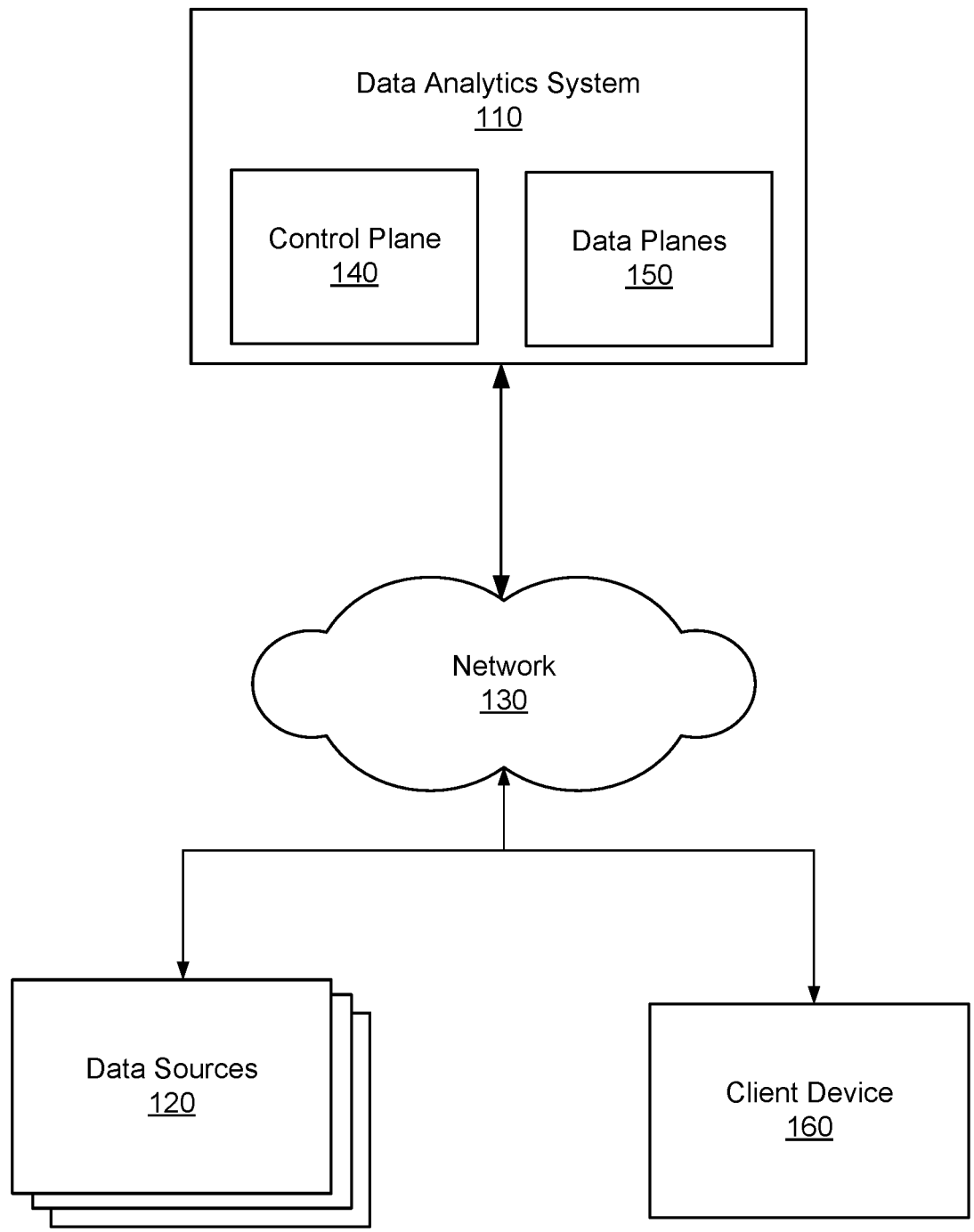
FIG. 1 is a block diagram illustrating a data analytics environment including a data analytics system according to one embodiment.

FIG. 1 is a block diagram illustrating a data analytics environment including a data analytics system 110 according to one embodiment. The illustrated environment of FIG. 1 further includes multiple data sources 120 and a client device 160 connected to the data analytics system 110 via a network 130. Although the illustrated environment contains only one data analytics system 110 coupled to multiple data sources 120, embodiments can have multiple data analytics systems and a singular data source.

The data sources 120 provide electronic data to the data analytics system 110. A data source 120 may be a storage device such as a hard disk drive (HDD) or solid-state drive (SSD), a computer managing and providing access to multiple storage devices, a storage area network (SAN), a database, or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130.

The data provided by the data sources 120 is typically organized into data records, with each data record including one or more values. For example, a data record provided by a data source 120 may include a series of comma-separated values. The data describe information of relevance to an enterprise using the data analytics system 110. For example, data from a data source 120 can describe computer-based interactions (e.g., click tracking data) with content accessible on websites and/or with social media applications.

The data analytics system 110 is a computer-based system utilized for processing and analyzing large amounts of data. The data are collected, gathered, or otherwise accessed from the multiple data sources 120 via the network 130. The data analytics system 110 can implement scalable software tools and hardware resources employed in accessing, preparing, blending, and analyzing data from a wide variety of data sources. For instance, the data analytics system 110 supports the execution of data intensive processes and workflows. The data analytics system 110 can be a computing device used to implement data analytics functions including the asynchronous data processing techniques described herein.

The data analytics system 110 processes and analyzes large amounts of data obtained from one or more of the data sources 120. In some cases, the data analytics system 110 provides software that supports network, or cloud-based, access to data analytic tools and macros by multiple end users. As an example, data analytics system 110 allows users to share, browse, and consume analytics in a manner similar to a mobile application store or other cloud-based service. Analytic data, macros, and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics system 110 can perform functions associated with analytic apps such as creating, deploying, publishing, iterating, updating, and the like. Additionally, the data analytics system 110 can support functions performed at various stages involved in data analytics, such as the ability to handle errors that occurred during data analytics, the ability to access, prepare, blend, analyze, and output analytic results, etc.

The data analytics system 110 can also support a software tool to design and execute repeatable workflows, via a visual graphical user interface (GUI). As an example, a GUI associated with the data analytics system 110 offers a drag-and-drop workflow environment for data blending, data processing, and advanced data analytics. Moreover, a workflow can include a series of data processing tools that perform specific processing operations or data analytics functions. Each tool that is part of a workflow performs a function related to data that is specific to the tool. As an example, a workflow can include tools implementing various data analytics functions including one or more of the following: input/output; preparation; join; predictive; spatial; investigation; and parse and transform operations. More details about workflow are described in conjunction with FIG. 2.

The data analytics system 110 reads blocks of data from the data sources 120. For example, the data analytics system 110 may read a data file that includes an ordered set of data blocks from an SSD. Each data block typically includes multiple data records, and the boundaries of the data records are often not aligned with the boundaries of the data blocks. Hence, a data record may span two or more adjacent blocks.

The data analytics system 110 processes each data block to extract data records contained therein. These data records are processed by the data analytics workflow implemented by the data analytics system 110. In one embodiment, the data analytics system 110 asynchronously processes the sequential data blocks using multiple worker threads executing in parallel. As a result, the data blocks may be processed out of order. In some embodiments, the data blocks are delivered to the data analytics system 110 out of order. Worker threads start processing data blocks as they come. Therefore, a data block later in the sequence (e.g., the third data block) may be processed before data blocks earlier in the sequence (e.g., the first and second data blocks).

The data analytics system 110 includes a control plane 140 and a set of data planes 150 that perform the tasks described above. The control plane is a logical plane (e.g., a virtual private cloud) that stores and manages shared resources of the data analytics system 110. For example, the control plane 140 handles tasks related to network management and configuration, message routing, and policy enforcement for the data analytics system 110. The data planes 150 are logical planes (e.g., virtual private clouds) that handle data processing tasks for the data analytics system 110. For example, the data planes 150 stores, accesses, and provides data for users and performs computations and analytics on data. The control plane 140 and the data planes 150 are described in further detail below.

The network 130 represents the communication pathways between the data analytics systems 110 and data sources 120. In one embodiment, the network 130 is the Internet and uses standard communications technologies and/or protocols. Thus, the network 130 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 130 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The client device 160 is a device through which a user may interact with the data analytics system 110. The client device 160 can be a personal or mobile computing device, such as a smartphone, a tablet, a laptop computer, or desktop computer. In some embodiments, the customer client device 160 executes a client application that uses an application programming interface (API) to communicate with the data analytics system 110. The client device 160 may transmit query requests to the data analytics system 110 and receive responses to those queries from the data analytics system. For example, the client device 160 may use an access token to communicate directly with the data plane 150 of the data analytics system 110. The client device's interactions with the data analytics system is described in further detail below.

Figure 2:
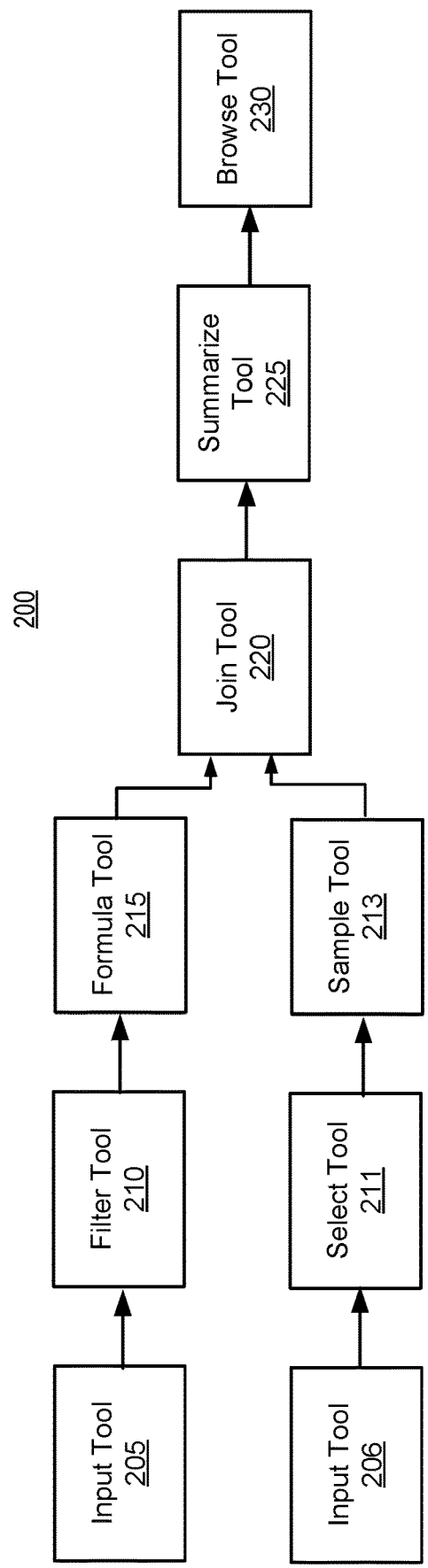
FIG. 2 is a block diagram illustrating a workflow created using the data analytics system to process data according to one embodiment.

FIG. 2 is a block diagram illustrating a workflow 200 created using the data analytics system 110 to process data according to one embodiment. In one embodiment, the workflow 200 is created using a visual workflow environment supported by a GUI of the data analytics system 110. The visual workflow environment enables a set of drag and drop tools that eliminate the need for providing software code to design a workflow and eliminate the need to identify complex formulas to be implemented by the workflow. In another embodiment, the workflow 200 is created and described in a document, such as an extensible markup language (XML) document. The workflow 200 is executed by a computer device of the data analytics system 110. However, in other embodiments, the workflow 200 is deployed to another computer device that may be communicatively connected, via a network (e.g., network 130), to the data analytics system 110.

A workflow can include a series of tools that perform specific processing operations or data analytics functions. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A packet including an aggregated group of individual data records can be passed through the tools of a workflow, which allows for the individual processing operations to operate more efficiently on the data. Such aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools execute in parallel.

As illustrated, the workflow 200 of FIG. 2 includes input/output tools, illustrated as input tools 205 and 206 and a browse tool 230. The input tools 205 and 206 function to access data records from particular data sources 120. The input tools 205 and 206 bring into the workflow the accessed data records and provide the data records to the subsequent tools of the workflow 200. In this example, the input tool 205 provides accessed data records to a filter tool 210 and the input tool 206 provides accessed data records to a select tool 211. The browse tool 230 is located at the end of the workflow 200 and receives the output resulting from the execution of each of the upstream tools of the workflow 200. Although the browse tool 230 is located at the end of the workflow 200 in this example, the browse tool 230 can be added at any point in a workflow to review and verify results from execution of upstream tools of the workflow.

In continuing with the example of FIG. 2, the workflow 200 includes preparation tools, shown as the filter tool 210, the select tool 211, a formula tool 215, and a sample tool 213. The filter tool 210 queries data records based on an expression and splits the data into two streams, a true stream that includes data records that satisfy the expression and a false stream that includes data records that do not satisfy the expression. The select tool 211 can be used to select, deselect, reorder and rename fields, change field type or size, and assign a description. The formula tool 215 creates or updates fields using one or more expressions to perform a broad variety of calculations and/or operations. The sample tool 213 limits a received stream of data records to a number, percentage, or random set of data records. The workflow 200 also includes a join tool 220 that blends multiple data sources. Specifically, the join tool 220 combines two input data streams based on common fields (or data record position).

The workflow 200 of FIG. 2 is also shown to include a summarize tool 225 which is a parse and transform tool that can restructure and re-shape data to a format used in further analysis. The summarize tool 225 can also perform summarization of data by grouping, summing, counting, spatial processing, and string concatenation. In one embodiment, the output generated by the summarize tool 225 contains the results of the calculation(s).

In some embodiments, execution of the workflow 200 will cause the input tool 205 to pass data records one at a time through the filter tool 210 and the formula tool 215, until all data records are processed and have reached the join tool 220. Thereafter, the input tool 206 will begin passing data records one at a time through the select tool 211 and sample tool 213, until the data records are passed to the same join tool 220. Some individual tools of the workflow 200 can possess the capability to implement their own parallel operation, such as initiating a read of a block of data while processing the last block of data or breaking computer-intensive operations, such as a sort tool, into multiple parts. However, in some existing workflow techniques, each data record from a set of data records is individually processed by each tool of the workflow one data record at a time, in a pipeline fashion, until a tool in the workflow is reached that requires multiple data records to perform the processing operation (e.g., sort tool, join tool, summarize tool, etc.)

Figure 3A:
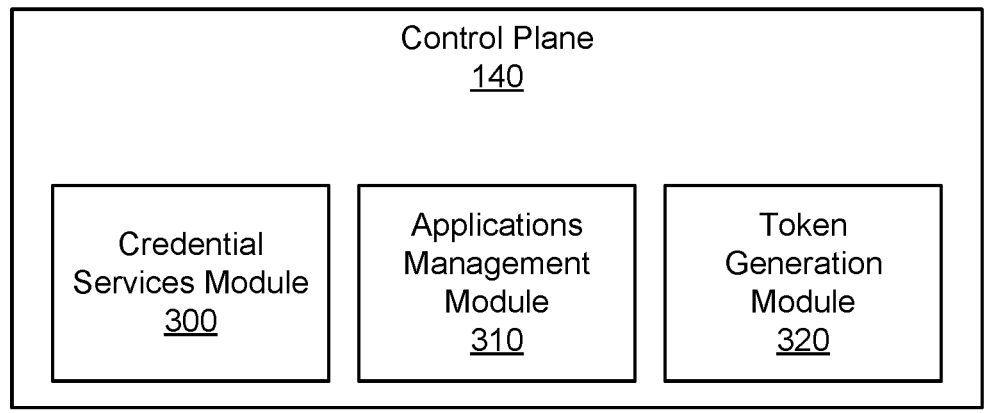
FIG. 3A illustrates an example structure of a control plane according to one embodiment.

FIG. 3A illustrates an example structure of a control plane, in accordance with some embodiments. Alternative embodiments may include more, fewer, or different modules from those illustrated in FIG. 3A, and the functionality of the modules may be divided up differently from the description herein.

As noted above, the control plane 140 is a logical plane (e.g., within a virtual private cloud) that stores and manages shared resources of the data analytics system 110. The control plane 140 is generally accessible by any user of the data analytics system 110 to allow for those users to manage their accounts with the data analytics system 110.

The credential services module 300 verifies the credentials of users who access the control plane 140 through client devices. For example, the credential services module 300 may store login information for users of the data analytics system and compare login information provided by users to the stored login information to verify a user's identity. The credential services module 300 may further store a mapping of users to data planes to which they have access and thereby manage user access to data planes.

The applications management module 310 manages and deploys applications that operate on the control plane 150.

For example, the applications management module 310 manages applications that monitor and maintain the physical resources used by the data analytics system, such as servers and networking resources. The applications management module 310 also may operate an application that manages the creation, maintenance, and deletion of data planes for users. In some embodiments, the applications management module 310 also provides an application programming interface (API) that allows client devices to interact with the control plane 140 or the data plane 150.

The token generation module 320 generates access tokens for client devices. An access token is a token that allows a client device to transmit query requests to modules in a data plane directly. For example, the access token may specify which target files a client device can access, which operations can be performed on those target files, and may include a checksum or digital signature to prevent tampering or errors. This information could then be sent to a Query Services Module 350 in the Data Plane.

Specifically, in some cloud infrastructure platforms, a data plane may check permissions and validate that a user is authorized to make a request. As a result, the data plane 150 would need to have access to information that the control plane 140 has to validate the user. In one embodiment, the control plane 140 described herein validates in the first user request that the user/client is authorized to access the systems/data (e.g., cloud storage) required to perform the request. The control plane 140 (the token generation module 320) then creates the signed access token which is then sent in a second request to a module in the data plane 150. In this manner, the module in the data plane 150 only needs to validate that the access token is valid and signed. In one instance, the data plane 150 does not validate that the user is authorized to access any of the systems required to perform the request as the first request sent to the control plane 140 has already done this step. Therefore, the module (s) in the data plane 150 can be implemented simpler, and only need to validate whether the access token is signed correctly by the control plane 140, and no additional authorization checks may be required. The generation and use of access tokens is described in further detail below.

Figure 3B:
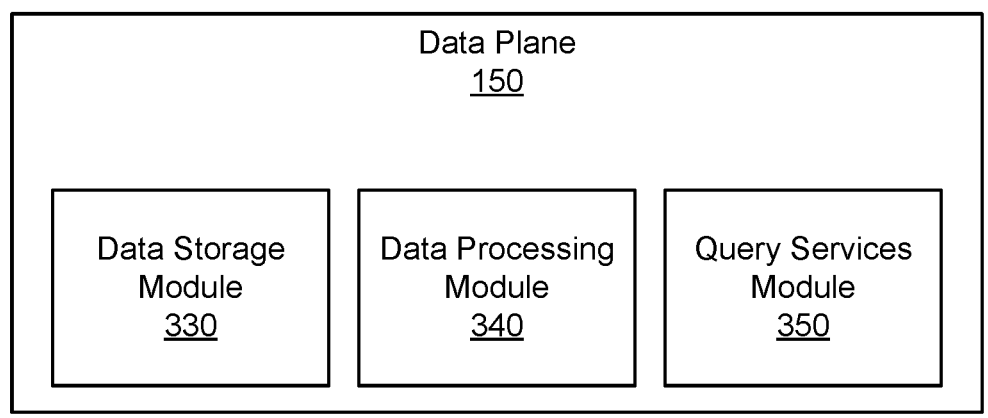
FIG. 3B is illustrates an example structure of a data plane according to one embodiment.

FIG. 3B illustrates an example structure of a data plane, in accordance with some embodiments. Alternative embodiments may include more, fewer, or different modules from those illustrated in FIG. 3B, and the functionality of the modules may be divided up differently from the description herein.

As noted above, a data plane 150 is a logical plane (e.g., a virtual private cloud) that handles data storage and processing tasks for the data analytics system 110. Whereas the control plane 140 is generally accessible by multiple users of the data analytics system, a data plane 150 is generally only accessible by users who are specifically associated with the data plane 150. For example, an entity (e.g., a business or organization) may create an account with the data analytics system 110 (e.g., through the control plane) and give certain users authorization to access data stored by the data plane.

The data storage module 330 stores data for the data plane. For example, the data storage module 330 may store data files provided by users of the data analytics system 110 in data assets, such as databases. In one instance, the data analytics system 110 is deployed on a cloud infrastructure platform, and the data storage module 330 may include cloud object storage or distributed storage. The data storage module 330 may access data for and provide data to the data processing module 340 or the query services module 350. The data storage module 330 also may receive data from the data processing module 340 or the query services module 350 to store in the data storage module 330. Each data plane may have their own data storage module 330 or data planes may share a single data storage module 330.

The data processing module 340 performs data analytics and other types of data processing on data stored by the data storage module 330. For example, the data processing module 340 may perform data processing workflows such as those illustrated in FIG. 2. The data processing module 340 may receive instructions from a client device or from the control plane 140 on what data to process and what processing workflow to apply to that data. The data processing module 340 may provide the results of such data processing workflows to the data storage module 330 for storage or transmit the results to a client device.

The query services module 350 services query requests from client devices. The query services module 350 receives data requests with access tokens from client devices and verifies whether the data files and operations requested in the data request are authorized by the access tokens. If the access token authorizes the client device to perform the requested operations on data in one or more data resources, the query services module 350 accessed the data in the one or more data resources and provides the results to the client device. The execution of queries from client devices using access tokens is described in further detail below.

Although not shown in FIG. 3B, the data plane 150 may be configured with a set of engines that are used to access data stored in the data storage module 330 and perform data analytics processes on the data. For example, the set of engines execute the workflow described in conjunction with FIG. 2. In one embodiment, the engines execute data analytics processes using high-speed data processing and analytics using machines' multiple cores and random-access memory (RAM). In one embodiment, the engines are configured to perform multi-threaded processing to process data in parallel packets, further improving speed and efficiency.

Figure 4:
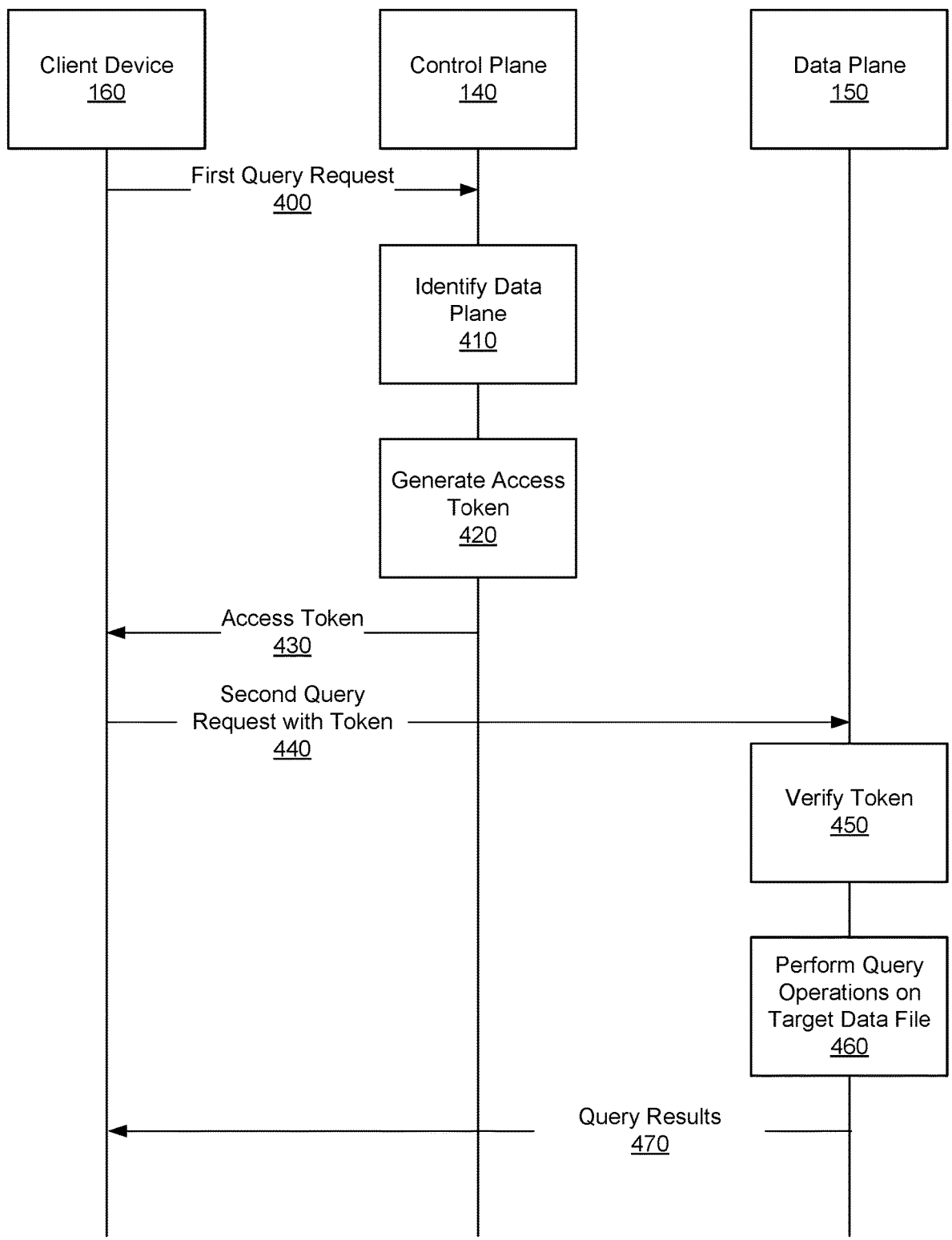
FIG. 4 is an interaction diagram that represents a method for servicing queries by a data plane of a data analytics system according to one embodiment.

FIG. 4 is an interaction diagram that represents a method for servicing queries by a data plane of a data analytics system, in accordance with some embodiments. Alternative embodiments may include more, fewer, or different steps from those illustrated in FIG. 4, and the steps may be performed in a different order from that illustrated in FIG. 4. Furthermore, each of the steps may be performed automatically and without human intervention.

A client device 160 transmits a first query request 400 to the control plane 140 of a data analytics system 110. The first query request 400 is a request by the client device 160 to perform certain operations on data accessible by one or more data resources. In one instances, the data resources are databases, cloud data warehouses, HTTP API's, data files, cloud object storage, and the like. Example operations that may be identified in the query request include commands to retrieve information from the data analytics system, alter information stored by the data analytics system, update information stored in the data analytics system, or compute analytics based on data files stored by the data analytics system. In some embodiments, the first query request comprises a SQL command(s) for the data analytics system.

The data access request 400 identifies which operations to perform and which data resources to access. The first query request may further include user credentials that verify that the user is authorized to access the data resources. In some embodiments, the first query request 400 is a POST request. For example, an example API request may be "POST/api/v1/accessTokens."

The control plane 140 receives the first query request 400 and identifies 410 a data plane 150 of the data analytics system that stores the target data files. The control plane 140 may identify the data plane 150 based on a user identifier for the user of the client device 160 that transmitted the data access request 400. For example, the control plane 140 may compare the received user identifier to a mapping of user identifiers to data planes. In some embodiments, the control plane 140 determines whether the client device 160 is authorized to perform the query in the first query request based on credentials provided with the first query request 400. That is, the control plane 140 checks whether the user associated with the client device is authorized to access all the systems and data sources for processing the request. If the client device 160 is not authorized to perform the query, the control plane 140 transmits a rejection message to the client device 160 indicating that the client device 160 is not authorized to perform the query in the first query request.

If the authorization check passes, the control plane generates 420 an access token based on the first query request 400 and the identified data plane. An access token is a token that contains authorization information that allows the client device 160 to directly query the identified data plane 150. In one embodiment, the signed access token includes the actual request and/or optionally a list of the systems or data resources that are authorized such that later, when the client device 160 provides the request to the query services module 350 in the data plane 150, the query processing module 350 can simply validate that the token was digitally signed by a module in the control plane 140. In other words, the query processing module 350 does not have to validate whether the user of the client device 160 is authorized to access the systems and data sources as that has already been checked by the control plane 140. In other words, the user is pre-authorized in the second request for anything specified in the signed access token.

In some embodiments, the access token includes information specifying certain characteristics or properties of the target data files or data resources requested by the client device 160. For example, the access token may include information specifying metadata of the one or more data resources, connection information for accessing the data resources, and credential values for the data resources. The access token also may include a checksum to prevent the client device from altering the access token. Alternatively, the access token may only include a checksum value for the query requested in the first query request 400, thereby preventing the client device from using the access token to perform a different query on the data plane.

In one embodiment, the access token is in the format of a JSON Web Token (JWT). For example, the access token may include an HTTP verb, a URL for a request, an HTTP header, and a JSON request body for the request. The JSON request body may include a dataset identifier, a connection identifier, or a credential identifier for the request. In one embodiment, the access token includes metadata on the dataset for the query, metadata for establishing a connection to the dataset (e.g., stored in cloud object storage), or credential values for accessing the dataset in the data storage module 330. In some embodiments, the access token is a temporary token, and expires after a predetermined time (e.g., 10 minutes, 20 minutes, etc.) or time-to-live (TTL) and is a short-lived token.

The control plane 140 transmits the generated access token 430 to the client device 160, and the client device uses the access token 430 to generate and transmit a second query request 440 to the data plane 150. The second query request 440 requests that the data plane 150 execute the query of the first query request 400 by performing the operations on the target data files. For example, an example API request may be "POST/api/v1/queries" with the access token. The query services module 350 of the data plane 150 assigns a query identifier (query ID) to the request that allows the query services module 350 to track the request as it is executed.

The data plane 150 verifies 450 the access token received with the second query request 440 to confirm that the client device is authorized to perform the query. For example, in addition to storage for storing data files of the datasets, the data storage module 330 of the data plane 150 may also be configured with an identity and access management service that verifies access tokens to verify whether a user bearing the access token is able to access the datasets. When engines are executing the query request and requesting access to data in the data storage module 330, the identity and access management service may confirm that the access token includes valid credentials that authorize the engine to query the requested datasets. The data plane 150 may also verify the accuracy of a checksum provided with the access token.

After verifying the access token, the data plane 150 performs 460 the query operations on the data in the one or more data resources and stores the query results 470 or transmits the query results 470 to the client device 160. In some embodiments, the data plane 150 transmits the query results 470 in response to receiving a GET request from the client device. For example, the second query request 440 may be a POST request from the client device that includes the access token. The data plane performs the query operations on the target data files and transmits the results of the query operations to the client device when the data plane receives a subsequent GET request from the client device that requests access to the query request with the particular query identifier. For example, an example API request for retrieving the results of the query may be "GET/api/v1/queries/{queryID}/content," where "queryID" indicates the query identifier assigned to the query request submitted by the client device 160.

In some embodiments, the access token 430 can only be used by the client device to perform the query operations on the target data files. In these embodiments, the access token 430 may expire after the data plane transmits the results to the client device. Alternatively, the access token 430 may be applicable to a session that the client device establishes with the data plane and may be used multiple times to request different query operations on different data files. For example, the first query request 400 may list certain data assets that contain data files of interest to the user of the client device. The client device may then use the access token in multiple subsequent data requests 440 to perform different query operations on different target data files by the data plane. In these embodiments, the access token may include an expiration time or a time-to-live that limits how long the access token 430 can be used.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A method comprising:
   receiving, from a client device at a control plane configured as a virtual private cloud accessible by multiple users of a data analytics system, a first query request to perform operations on data accessible by one or more data resources;
   performing an authorization check on whether a user of the client device is authorized to access the one or more data resources;
   responsive to the authorization check, generating, by the control plane, an access token based on the first query request, wherein the access token is a token that contains authorization information indicating the one or more data resources the user of the client device is allowed to access;
   transmitting, by the control plane, the access token to the client device;
   receiving, from the client device at a data plane associated with the user of the client device, a second query request to perform operations on the data, wherein the second query request comprises the access token and the data plane is configured as a separate virtual private cloud from the control plane virtual private cloud;
   in response to validating the access token for the second query request, executing, by computing resources in the data plane, the second query request by at least accessing the one or more data resources to generate results for the second query request; and
   transmitting the results for the second query request to the client device.

2. The method of claim 1, wherein the access token comprises information specifying metadata of the one or more data resources, connection information for accessing the one or more data resources, and credential values, and wherein executing the second query request comprises:
   accessing, by the data plane, the one or more data resources based on the information specifying the metadata of the one or more data resources.

3. The method of claim 2, wherein the access token is a JSON Web Token.

4. The method of claim 1, wherein the data plane is one of a set of data planes of the data analytics system and wherein each data plane of the set of data planes is a separate virtual private cloud accessible by a respective subset of users of the data analytics system.

5. The method of claim 1, wherein the first query request received at the data plane is a POST request from the client device.

6. The method of claim 5, wherein executing the second query request comprises:
   responsive to receiving the second query request, storing, by the data plane, results for the POST request;
   receiving, by the data plane from the client device, a GET request for the stored results; and
   responsive to receiving the GET request, transmitting the stored results to the client device.

7. The method of claim 1, wherein the second query request is executed by computing resources in the data plane without the computing resources in the data plane communicating with computing resources in the control plane regarding a set of target data files.

8. A non-transitory computer-readable medium storing instructions that, when executed by a processor, cause the processor to perform operations comprising:
   receiving, from a client device at a control plane configured as a virtual private cloud accessible by multiple users of a data analytics system, a first query request to perform operations on data accessible by one or more data resources;
   performing an authorization check on whether a user of the client device is authorized to access the one or more data resources;
   responsive to the authorization check, generating, by the control plane, an access token based on the first query request, wherein the access token is a token that contains authorization information indicating the one or more data resources the user of the client device is allowed to access;
   transmitting, by the control plane, the access token to the client device;
   receiving, from the client device at a data plane associated with the user of the client device, a second query request to perform operations on the data, wherein the second query request comprises the access token and the data plane is configured as a separate virtual private cloud form the control plane virtual private cloud;
   in response to validating the access token for the second query request, executing, by computing resources in the data plane, the second query request by at least accessing the one or more data resources to generate results for the second query request; and
   transmitting the results for the second query request to the client device.

9. The non-transitory computer-readable medium of claim 8, wherein the access token comprises information specifying metadata of the one or more data resources, connection information for accessing the one or more data resources, and credential values, and wherein executing the second query request comprises:
  accessing, by the data plane, the one or more data resources based on the information specifying the metadata of the one or more data resources.

10. The non-transitory computer-readable medium of claim 9, wherein the access token is a JSON Web Token.

11. The non-transitory computer-readable medium of claim 8, wherein the data plane is one of a set of data planes of the data analytics system and wherein each data plane of the set of data planes is a separate virtual private cloud accessible by a respective subset of users of the data analytics system.

12. The non-transitory computer-readable medium of claim 8, wherein the first query request received at the data plane is a POST request from the client device.

13. The non-transitory computer-readable medium of claim 12, wherein executing the second query request comprises:
  responsive to receiving the second query request, storing, by the data plane, results for the POST request;
  receiving, by the data plane from the client device, a GET request for the stored results; and
  responsive to receiving the GET request, transmitting the stored results to the client device.

14. The non-transitory computer-readable medium of claim 8, wherein the second query request is executed by computing resources in the data plane without the computing resources in the data plane communicating with computing resources in the control plane regarding a set of target data files.

15. A data analytics system comprising:
  a control plane configured as a virtual private cloud accessible by multiple users of the data analytics system;
  a data plane configured as a separate virtual provide cloud from the control plane;
  one or more processors; and
  a computer-readable medium storing instructions that are executable by the one or more processors to perform operations comprising:
    receiving, from a client device at the control plane, a first query request to perform operations on data accessible by one or more data resources;
    performing an authorization check on whether a user of the client device is authorized to access the one or more data resources;
    responsive to the authorization check, generating, by the control plane, an access token based on the first query request, wherein the access token is a token that contains authorization information indicating the one or more data resources the user of the client device is allowed to access;
    transmitting, by the control plane, the access token to the client device;
    receiving, from the client device at the data plane, a second query request to perform operations on the data, wherein the second query request comprises the access token and wherein the data plane is associated with the user of the client device;
    in response to validating the access token for the second query request, executing, by computing resources in the data plane, the second query request by at least accessing the one or more data resources to generate results for the second query request; and
    transmitting the results for the second query request to the client device.

16. The data analytics system of claim 15, wherein the access token comprises information specifying metadata of the one or more data resources, connection information for accessing the one or more data resources, and credential values, and wherein executing the second query request comprises:
  accessing, by the data plane, the one or more data resources based on the information specifying the metadata of the one or more data resources.

17. The data analytics system of claim 15, wherein the access token is a JSON Web Token.

18. The data analytics system of claim 15, wherein the data plane is one of a set of data planes of the data analytics system and wherein each data plane of the set of data planes is a separate virtual private cloud accessible by a respective subset of users of the data analytics system.

19. The data analytics system of claim 15, wherein the first query request received at the data plane is a POST request from the client device.

20. The data analytics system of claim 19, wherein executing the second query request comprises:
  responsive to receiving the second query request, storing, by the data plane, results for the POST request;
  receiving, by the data plane from the client device, a GET request for the stored results; and
  responsive to receiving the GET request, transmitting the stored results to the client device.

* * * * *